United States Patent
Cornelison

(10) Patent No.: US 10,321,668 B1
(45) Date of Patent: Jun. 18, 2019

(54) FISHING LURE WITH INTERCHANGEABLE DISKS

(71) Applicant: Wyndall Cornelison, Ardmore, OK (US)

(72) Inventor: Wyndall Cornelison, Ardmore, OK (US)

(*) Notice: Subject to any disclaimer, the term of this patent is extended or adjusted under 35 U.S.C. 154(b) by 522 days.

(21) Appl. No.: 15/083,473

(22) Filed: Mar. 29, 2016

(51) Int. Cl.
*A01K 85/00* (2006.01)

(52) U.S. Cl.
CPC .................................. *A01K 85/00* (2013.01)

(58) Field of Classification Search
CPC .............................................. A01K 85/00–18
USPC ........................................................ 43/42.09
See application file for complete search history.

(56) References Cited

U.S. PATENT DOCUMENTS

| | | | | |
|---|---|---|---|---|
| 2,764,834 A | * | 10/1956 | Klein | A01K 85/16 43/42.09 |
| 2,769,267 A | | 11/1956 | Ansley | |
| 2,996,826 A | * | 8/1961 | Lamar | A01K 85/16 43/42.09 |
| 3,408,764 A | * | 11/1968 | McCurry | A01K 85/16 43/42.09 |
| 4,745,699 A | * | 5/1988 | Gage | A01K 85/16 43/42.09 |
| 4,870,776 A | | 10/1989 | Schack | |
| 5,131,182 A | * | 7/1992 | Ising | A01K 85/16 43/42.33 |
| 5,566,496 A | | 10/1996 | Rutherford | |
| D382,627 S | | 8/1997 | Lisle | |
| 5,678,349 A | * | 10/1997 | Pacora | A01K 85/16 43/42.06 |
| 5,918,405 A | * | 7/1999 | Marusak | A01K 85/16 43/42.09 |
| 5,934,007 A | | 8/1999 | Ellestad | |
| 6,606,815 B1 | * | 8/2003 | Toris | A01K 85/14 43/42.09 |
| 6,862,836 B1 | * | 3/2005 | Ridings | A01K 85/02 43/35 |
| 7,827,731 B2 | | 11/2010 | Gibson | |
| 8,627,594 B1 | * | 1/2014 | Weron | A01K 85/16 43/42.09 |
| 2011/0010983 A1 | * | 1/2011 | Briccetti | A01K 85/00 43/17.6 |

(Continued)

FOREIGN PATENT DOCUMENTS

WO 2012135916 A1 10/2012

*Primary Examiner* — Marc Burgess
(74) *Attorney, Agent, or Firm* — Kyle A. Fletcher, Esq.

(57) ABSTRACT

The fishing lure with changeable disks is adapted for use in fishing. Specifically, the fishing lure with changeable disks is designed to allow a fisherman to change the appearance of a lure without having to the physically untie and retie lures as part of the change process. This is done through the use of an interchangeable disk selected from a plurality of disks. Each interchangeable disk selected from the plurality of disks can be mounted within a lure housing. Each interchangeable disk selected from the plurality of disks is designed to give the lure housing a different appearance to a fish. The interchangeable disks selected from the plurality of disks can be substituted for any interchangeable disk remaining within the plurality of disks. The fishing lure with changeable disks comprises a mimic, a plurality of disks, and one or more hooks.

13 Claims, 5 Drawing Sheets

(56) References Cited

U.S. PATENT DOCUMENTS

2014/0190064 A1\* 7/2014 Fellbaum ............... A01K 85/16
43/42.09
2016/0165866 A1\* 6/2016 LaMey ................. A01K 85/18
43/42.09

\* cited by examiner

US 10,321,668 B1

FISHING LURE WITH INTERCHANGEABLE DISKS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of fishing and angling, more specifically, an artificial lure for use in fishing.

One of the challenges of fishing is anticipating the type of lure that a game fish will be attracted to on any given day. Most fisherman use a trial and error method of determining the most appropriate lure by trying several lures to test which lure seems most attractive to the game fish. Unfortunately, changing lures often requires removing the prior lure from a fishing line and replacing the prior lure and a new potential lure. This tying and untying of lures is both an inconvenient and troublesome procedure that interferes with the enjoyment of fishing.

Clearly, a method to change lures without requiring the untying and retying lures would be of benefit to fisherman.

SUMMARY OF INVENTION

The above shortcomings of fishing lures is addressed in this disclosure. The fishing lure with changeable disks is adapted for use in fishing. Specifically, the fishing lure with changeable disks is designed to allow a fisherman to change the appearance of a lure without having to the physically untie and retie lures as part of the change process. This is done through the use of an interchangeable disk selected from a plurality of disks. Each interchangeable disk selected from the plurality of disks can be mounted within a lure housing, also known as a mimic. Each interchangeable disk selected from the plurality of disks is designed to give the mimic a different appearance to a game fish. The interchangeable disks selected from the plurality of disks can be substituted for any interchangeable disk remaining within the plurality of disks.

These together with additional objects, features and advantages of the fishing lure with interchangeable disks will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing lure with interchangeable disks in detail, it is to be understood that the fishing lure with interchangeable disks is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing lure with interchangeable disks.

It is therefore important that the claims be regarded as including such equivalent construction insofar as they do not depart from the spirit and scope of the fishing lure with interchangeable disks. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
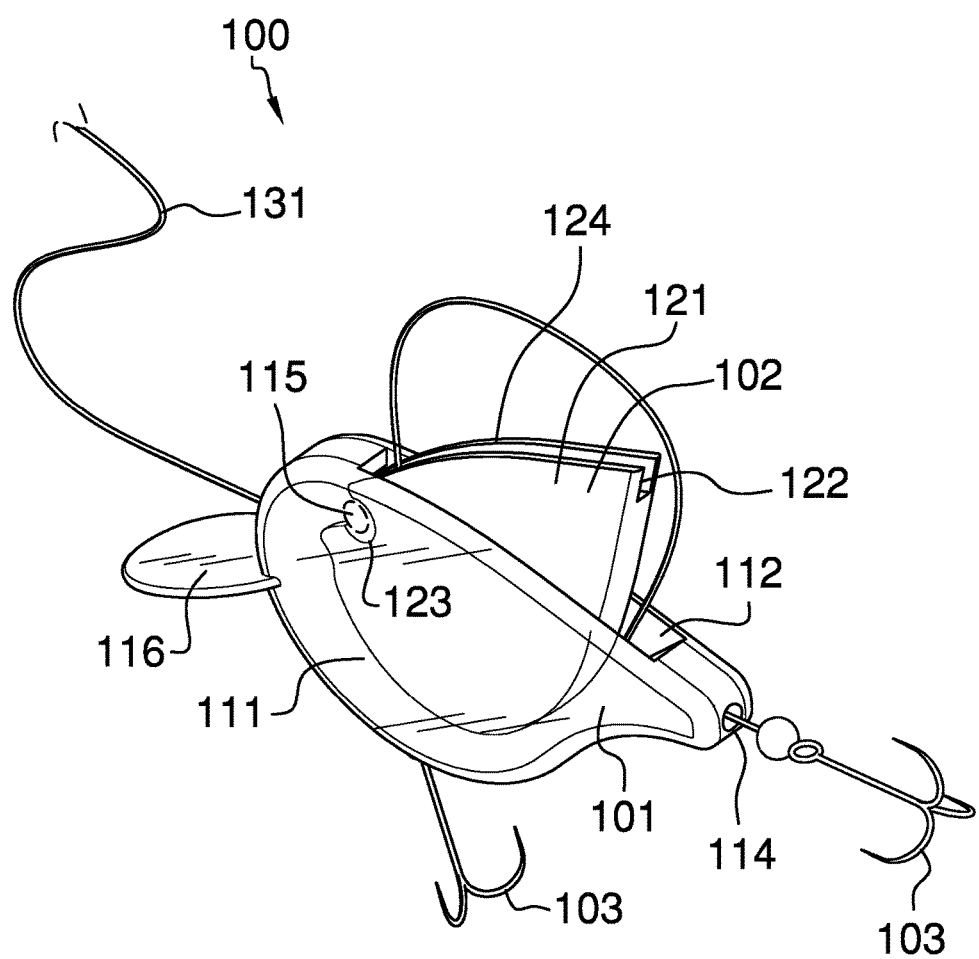
FIG. 1 is a perspective view of an embodiment of the disclosure.
Figure 2:
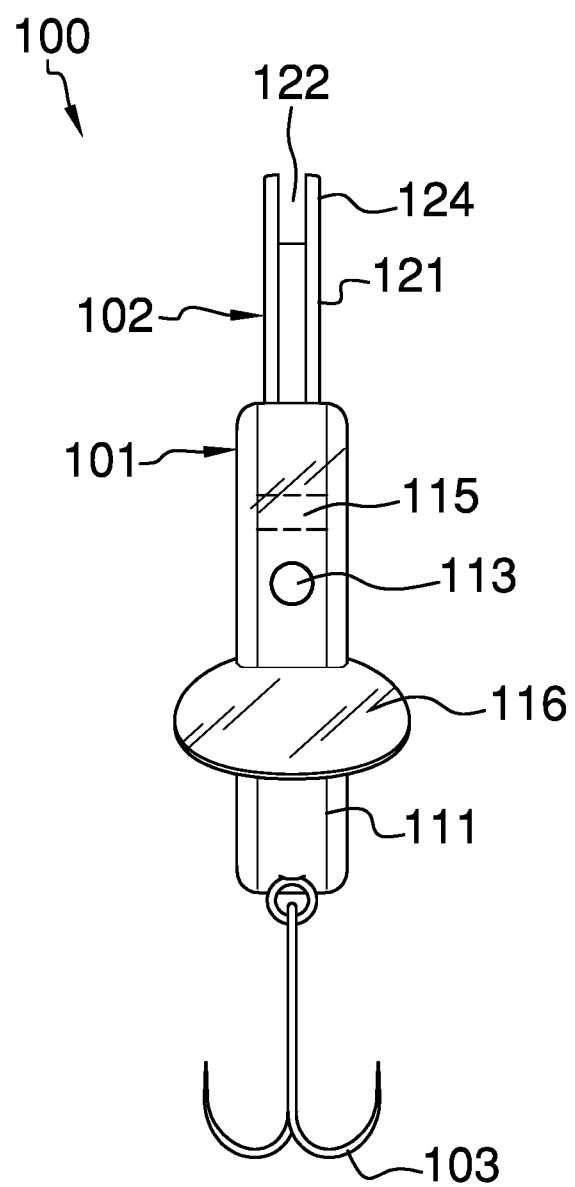
FIG. 2 is a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5.

The fishing lure with changeable disks 100 (hereinafter invention) comprises a mimic 101, a plurality of disks 102, one or more hooks 103. The invention 100 is adapted for use in fishing. Specifically, the invention 100 is designed to allow a fisherman to change the appearance of a fishing lure without having to the physically untie and retie fishing lures as part of the change process. This is done through the use of an individual interchangeable disk 121 selected from a plurality of disks 102. Each individual interchangeable disk 121 selected from the plurality of disks 102 can be mounted within the mimic 101. Each individual interchangeable disk 121 selected from the plurality of disks 102 is designed to give the mimic 101 a different appearance to a game fish. The individual interchangeable disk 121 selected from the plurality of disks 102 can be substituted for any individual interchangeable disk 121 remaining within the plurality of disks 102.

The mimic 101 is the base structure upon which the invention 100 is built. The mimic 101 comprises a hollow housing 111, a disk slot 112, a first line hole 113, a second line hole 114, and a pivot bar 115. Optionally, the mimic 101 can further comprise one or more control surfaces 116. The hollow housing 111 is a shell with a hollow interior 117 that is generally formed in a shape that emulates a bait fish or other bait-like object (hereinafter baitfish). The hollow housing 111 is formed from a transparent material thereby allowing an individual interchangeable disk 121 to determine the color and pattern of the invention 100 during use. By exchanging the individual interchangeable disk 121 selected from the plurality of disks 102, the appearance, including the pattern and color, of the invention 100 is changed which changes the allure of the invention 100 to game fish. The hollow interior 117 of the hollow housing 111 is accessed through the disk slot 112.

Figure 4:
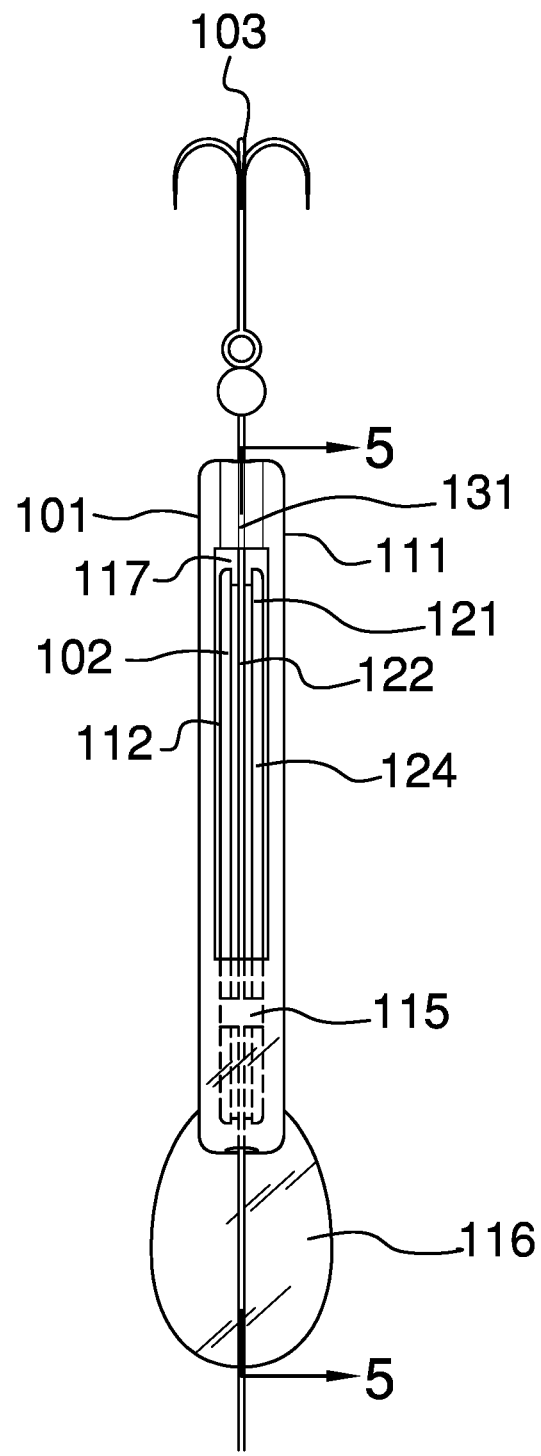
FIG. 4 is a top view of an embodiment of the disclosure.

As shown most clearly in FIGS. 1 and 4, the disk slot 112 is a rectangular aperture that is formed in the hollow housing 111 such that the hollow interior 117 can receive an individual interchangeable disk 121. As shown most clearly in FIG. 1, the pivot bar 115 is a cylindrical structure that is formed in the hollow interior 117 by the disk slot 112. The purpose of the pivot bar 115 is to help hold the individual interchangeable disk 121 in the hollow housing 111 during use. The operation of the pivot bar 115 is discussed elsewhere in this disclosure. The first line hole 113 and the second line holes 114 are holes formed within the hollow housing 111 that allow the hollow housing 111 to be attached to a fishing line 131. Specifically, the fishing line 131 is threaded into the first line hole 113, through the hollow interior 117 and out of the second line hole 114. The end of the fishing line 131 that is threaded out of the second hole is tied to a fishing hook selected from the one or more hooks 103. The use of one or more control surfaces 116 is optional. Each of the one or more control surfaces 116 is a rudder, flap, or aileron that is used to control the motion of the invention 100 as it moves through the water. The purpose of the one or more control surfaces 116 is to: 1) enhance the appearance of the invention 100 such that the invention 100 will more closely emulate the bait fish the hollow housing 111 is intended to emulate; and 2) to control the motion of the invention 100 when in water. For example, the control surface selected from the one or more control surfaces 116 that is shown in FIG. 1 is designed to bring the invention 100 to the bottom of a body of water such that the invention 100 will attract the game fish that prefer such a location.

The location of the disk slot 112, the first line hole 113, and the second line hole 114 on the hollow housing 111 are dependent on the shape of the bait fish the hollow housing 111 is intended to emulate. The first line hole 113 and the second line hole 114 are positioned such that when the invention 100 is pulled by a fishing line 131 the motion of the invention 100 as it appears to the game fish will emulate the bait fish the hollow housing 111 is intended to emulate. If used, the shape and the location of the one or more control surfaces 116 on the hollow housing 111 are dependent on the shape and natural motions of the bait fish the mimic 101 is intended to emulate.

The plurality of disks 102 further comprises a collection of individual interchangeable disks 121. Each individual interchangeable disk 121 further comprises a line slot 122 and a pivot catch 123. Each individual interchangeable disk 121 is further defined with a top edge 124. Each of the individual interchangeable disks 121 is shaped to fit within the hollow interior 117 of the hollow housing 111. Each of the individual interchangeable disks 121 is decorated with a combination of colors and patterns. When an individual interchangeable disk 121 this decoration is intended to make the invention 100 appear to a game fish as a bait fish.

The line slot 122 is a groove that is formed in each individual interchangeable disk 121 in the top edge 124. Each individual interchangeable disk 121 is inserted into the hollow interior 117 such that the line slot 122 faces out through the disk slot 112. As shown most clearly in FIGS. 1 and 3, to insert an individual interchangeable disk 121 into the hollow housing 111 the fishing line 131 is first pulled out of the hollow interior 117 such that the individual interchangeable disk 121 is inserted into the hollow interior 117 such that the fishing line 131 runs between the individual interchangeable disk 121 and the disk slot 112. The fishing line 131 is then pulled taut such that the fishing line 131 runs through the line slot 122 during use. The theory of operation of the line slot 122 is a follows: when the invention 100 is drawn through the water, the drag of the water on and the invention 100 places a load on the fishing line 131. This load places a tension on the fishing line 131 that pulls the fishing line 131 taut during use. This tension on the fishing line 131 is used to hold the individual interchangeable disk 121 contained within the hollow interior 117 during use.

Figure 3:
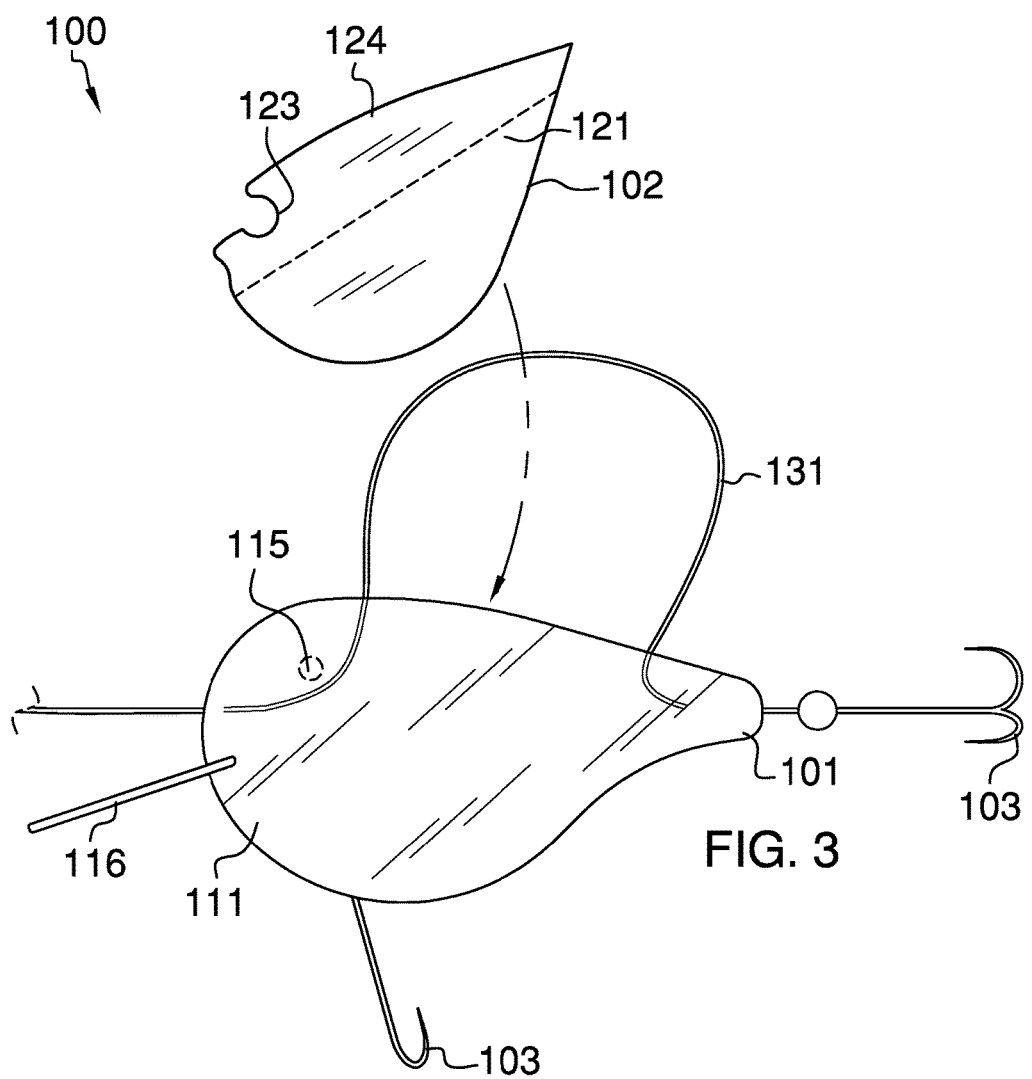
FIG. 3 is an exploded side view of an embodiment of the disclosure.
Figure 5:
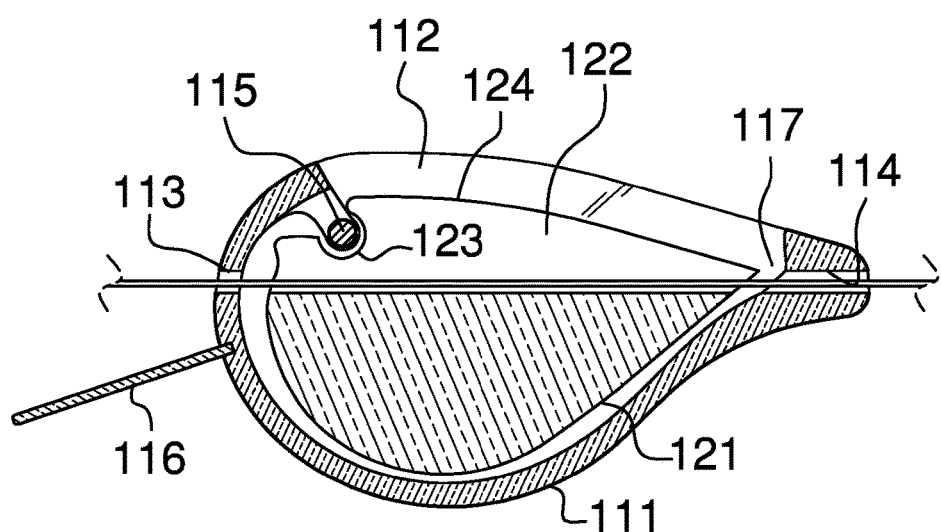
FIG. 5 is a cross-sectional view of an embodiment of the disclosure across 5-5 as shown in FIG. 4.

As shown most clearly in FIGS. 3 and 5, the pivot catch 123 is an indentation that is formed in the top edge 124 of each individual interchangeable disk 121. The pivot catch 123 is shaped, sized and positioned such that when any individual interchangeable disk 121 is inserted properly into the hollow interior 117, the pivot catch 123 fits around the pivot bar 115 which further secures the individual interchangeable disk 121 within the hollow interior 117. Methods to attach objects to bars are well known and documented in the mechanical arts.

To use the invention 100, the invention 100 is attached to the fishing line 131 as described above. The invention 100 is then used as a normal fishing lure.

In the first potential embodiment of the disclosure, the mimic 101 is formed from a transparent molded plastic. Suitable plastics include, but are not limited to, poly(methyl methacrylic) and polycarbonate. Each individual interchangeable disk 121 is formed from a molded plastic. Suitable plastics include, but are not limited to, poly(methyl methacrylic), polycarbonate, or polyethylene. Each individual interchangeable disk 121 can be dyed during the molding process, or, can be subsequently processed to form the specific external patterns and shades of the individual interchangeable disk 121. Methods to apply patterns and colors to plastic components are well known and documented in the manufacturing arts. Hooks are readily and commercially available. Methods to attach hooks to lures are well known and documented in the fishing arts if more than one hook 103 is used with the invention 100.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A lure comprising:
a mimic and a plurality of individual interchangeable disks;
wherein the lure is adapted for use in fishing;
wherein the lure is designed to allow a fisherman to change the appearance of the lure without having to attach or detach the lure from the fishing line;
wherein the lure further comprises one or more hooks;
wherein the appearance of the lure is configured to be changed through the use of an individual interchangeable disk selected from a plurality of disks;
wherein each individual interchangeable disk selected from the plurality of disks is adapted to mimic an appearance to a game fish that is different from any individual interchangeable disk remaining within the plurality of disks;
wherein any individual interchangeable disk selected from the plurality of individual interchangeable disks can be substituted for any individual interchangeable disk remaining within the plurality of individual interchangeable disks;
wherein the mimic comprises a hollow housing, a disk slot, a first line hole, a second line hole, and a pivot bar;
wherein the hollow housing is constructed of a transparent material, and is further defined as a shell with a hollow interior;
wherein each individual interchangeable disk selected from the plurality of disks is shaped to fit within the hollow interior of the hollow housing;
wherein each individual interchangeable disk further comprises a top edge, wherein the top edge further comprises a line slot and a pivot catch;
wherein, in use, the lure is configured such that a fishing line can enter the hollow interior through the first hole, extend across the pivot bar, extend through the line slot of an individual interchangeable disk inserted in the hollow interior, then exit the hollow interior through the second hole, such that tension on the fishing line acts to retain the individual interchangeable disk within the hollow interior.

2. The lure according to claim 1 wherein the hollow housing is the shape of bait.

3. The lure according to claim 2 wherein the hollow interior of the hollow housing is configured to be accessed through the disk slot.

4. The lure according to claim 3 wherein the disk slot is an aperture that is formed in the hollow housing such that the hollow interior can receive an individual interchangeable disk.

5. The lure according to claim 4 wherein the pivot bar is a cylindrical structure that is formed in the hollow interior.

6. The lure according to claim 5 wherein the first line hole and the second line holes are holes formed within the hollow housing.

7. The lure according to claim 6 wherein the mimic further comprises one or more control surfaces.

8. The lure according to claim 7 wherein each of the one or more control surfaces is configured to control the motion of the lure as it moves through the water.

9. The lure according to claim 7 wherein each of the individual interchangeable disks is decorated with a combination of colors and patterns.

10. The lure according to claim 9 wherein the line slot is a groove that is formed in each individual interchangeable disk in the top edge.

11. The lure according to claim 10 wherein each individual interchangeable disk is configured to be inserted into the hollow interior such that the line slot faces out through the disk slot.

12. The lure according to claim 11 wherein the pivot catch is an indentation that is formed in the top edge of each individual interchangeable disk.

13. The lure according to claim 12 wherein the pivot catch is shaped, sized and positioned such that the pivot catch fits around the pivot bar.

* * * * *